3,384,632
ARYLAZO-4-ISOPROPOXY-1-NAPHTHOL
COMPOUNDS
Warren E. Solodar, Rochester, N.Y., assignor to Xerox Corporation, Rochester, N.Y., a corporation of New York
No Drawing. Filed Apr. 2, 1965, Ser. No. 445,240
3 Claims. (Cl. 260—197)

ABSTRACT OF THE DISCLOSURE

Compounds of the formula:

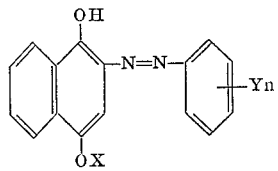

wherein
X is lower alkyl,
y is lower alkyl, lower alkoxy, lower carbalkoxy, carboxy, nitro, cyano, halo or sulfonamido and
cyano halo or sulfonamido and
n is a positive integer of from 1 to 4, which compounds are useful as pigments in coating and molding compositions.

---

This invention relates to new compositions and to their manufacture and use. It is particularly directed to new pigments which have an intense red-magenta color.

Many red-magenta pigments, both organic and inorganic, are known and used in the prior art. While the known pigments are generally useful, the individual pigments generally have different specific undesirable characteristics. Inorganic pigments, as a class, generally exhibit high resistance to light, water, alcohol, and oils, but have poor dispersing properties. Organic pigments, while generally higher in cost and lower in resistance to degrading influences, generally have dispersing and working characteristics and color qualities superior to inorganic pigments. A great many organic red-magenta pigments are known. The following pigments are typical. Anthracene pigments are generally very resistant to the influence of light, heat, acids and alkalies, but they tend to bleed in alcohol and are very expensive. Beta-oxy-naphthoic pigments are resistant to light, acid, alkalies, and oils but have an especially hard texture and are difficult to disperse in carriers. The Watchung Red pigments from E. I. du Pont de Nemours & Co. have a high resistance to the influence of light and heat but only fair resistance to organic solvents. Triphenylmethane dyestuffs have brilliant, clean colors, but are very unstable. They often bleed in water and alcohol and have low resistance to acids and alkalies. Helio Bordeaux type pigments have high light and heat fastness but bleed in many organic solvents. Indanthrene pigments lack brilliance and tinctorial strength, but are among the most permanent pigments known. They are available in an especially wide range of hues. Lithol Reds have good tinctorial strength, and brilliant color. Their cost is low, but they have only fair light and heat resistance. Naphthol Reds have good resistance to water and light but low resistance to heat influences. Para Reds are especially lightfast but have low brilliance and darken with heat. Toluidine pigments have high light resistance but only fair resistance to acids and alkalies. These pigments may bleed in oil. Rhodamine pigments have brilliant clean colors but generally low resistance to degrading influences. As is apparent by the above discussion, most pigments have both desirable and undesirable characteristics. Thus, there is a continuing need for improved pigments having good resistance to degradation, good dispersing characteristics and brilliant, clean, colors.

It is, therefore, an object of this invention to provide pigments which substantially overcome the above-noted deficiencies.

It is a further object of this invention to provide compositions having an intense red-magenta color.

It is a still further object of this invention to provide new pigmented coating and molding compositions.

The foregoing objects and others are accomplished in accordance with this invention, basically, by providing novel compositions having the general formula:

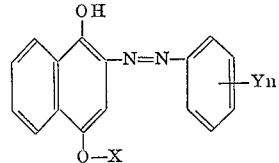

wherein:
X is selected from the group consisting of lower alkyl groups;
The Y's are each selected from the group consisting of lower alkyl, lower alkoxy, lower carboxy, nitro, cyano, halo, and sulfonamido radicals; and,
n is a positive integer from 1 to 4.

The compositions of the general formula given above belong to the general class of substituted 2-(phenylazo)-4-alkoxy-1-naphthols. These compositions may be made by reacting a 4-alkoxy-1-naphthol with, in a diazonium solution, a composition having the general formula:

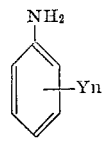

wherein:
The Y's are each selected from the group consisting of lower alkyl, lower alkoxy, lower carboxy, nitro, cyano, halo and sulfonamido radicals; and,
n is a positive integer from 1 to 4.

The compositions of this invention have the common characteristics of a brilliant, intense red-magenta color and of insolubility in water and the common organic solvents, e.g. benzene, toluene, acetone, carbon tetrachloride, chloroform, alcohols, and aliphatic hydrocarbons, and thus may be dispersed in the usual paint and ink vehicles without dissolving excessively.

Of the compositions within the general formula given above, those where Y represents single substituent in the "para" position are preferred since they are the most easily and inexpensively synthesized and have especially good color characteristics. Of these, optimum purity, brilliance and intensity of color and durability when used in a coating composition have been obtained with 2-(4'-toluazo)-4-isopropoxy-1-naphthol and 2-(4'-carboxyphenylazo)-4-isopropoxy-1-naphthol. Since the shade or tone of the pigments of this invention vary slightly depending upon the substituent, intermediate shades or tones may be obtained by mixing several of the pigments, while retaining the other desirable properties these compositions enjoy as a group. The 2-(phenylazo)-4-alkoxy-1-naphthol compositions when substituted as described above have properties superior to the unsubstituted compounds.

The following examples further define and describe methods of making the compositions of the present invention. Parts and percentages are by weight unless otherwise indicated. The examples below should be considered to illustrate various preferred embodiments of the invention.

Example I

A chilled solution of about 3.5 parts of 4-toluidine in about 33 parts of 3-normal hydrochloric acid is diazotized by the drop-wise addition of a solution of about 2.2 parts of sodium nitrite in about 10 parts of water. This diazonium solution is then slowly added to a chilled de-aerated solution of about 6 parts of 4-isopropoxy-1-naphthol in about 150 parts of 1-normal sodium hydroxide solution. The precipitate that forms is filtered off, washed with water, and desiccated in vacuum over phosphorus pentoxide. This yields about 8.5 parts of a magenta solid melting at 115° to 118° C. Recrystallization from ethanol yields magenta needles melting at 128° to 130° C. This product is 2-(4'-toluazo)-4-isopropoxy-1-naphthol.

Example II

A solution of about 3 parts of 4-amino-benzoic acid and about 1.5 parts of sodium nitrite in about 20 parts of 1.5-normal sodium carbonate solution and ice is poured into about 35 parts of 3-normal hydrochloric acid and ice. After standing about 10 minutes, the diazonium solution is filtered into a chilled solution of about 4 parts of 4-isopropoxy-1-naphthol in about 150 parts of 1-normal sodium hydroxide solution. The resulting magenta colored solution is stirred for about 10 minutes, then acidified with concentrated hydrochloric acid. The precipitate that separates is warmed to facilitate coagulation, then filtered and desiccated in vacuum over phosphorus pentoxide. This yields about 6.5 parts of a magenta-colored solid melting at 230° to 240° C. Recrystallization from anisole gives magenta crystals melting at from 279° to 283° C., with decomposition. This prdouct is 2-(4'-carboxyphenylazo)-4-isopropoxy-1-naphthol.

Examples III–XX

In Examples III–XX, the product is produced by the process of Example I above, with the p-toluidine replaced by the appropriated substituted phenylamine and the 4-isopropoxy-1-naphthol replaced by the appropriate 4-alkoxy-1-naphthol. In the table which follows, Column 1 lists the number of the example, Column 2 lists the parts by weight of the substituted phenylamine, Column 3 lists the phenylamine, Column 4 lists the parts by weight of the 4-alkoxy-1-naphthol, Column 5 lists the particular 4-alkoxy-1-naphthol, and Column 6 lists the product.

The following examples further define typical uses for the compositions for the present invention.

Example XXI

About 100 parts of 2-(4'-toluazo)-4-isopropoxy-1-naphthol, having the structure:

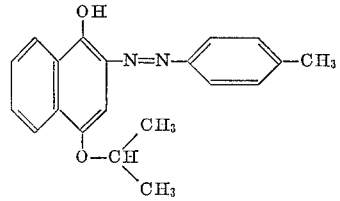

prepared as in Example I above, is gradually added to about 100 parts of a vinyl resin varnish, containing about 20 percent Vinylite XYHL, a vinyl resin available from Union Carbide Corporation, about 40 percent nitroethane and about 40 percent xylol, in a mixing vessel with mild agitation. After the pigment is uniformly dispersed in the carrier, the composition is coated onto a steel panel, as by brushing, spraying or dipping and air dried. Upon examination, the coated surface is found to have an intense, bright red-magenta color and a hard durable surface.

Example XXII

A pigmented coating composition is prepared as follows: About 50 parts of an N-butylmethacrylate-methacrylic acid interpolymer is dissolved in about 100 parts of toluene. The solution is milled in a ball mill with about 20 parts of 2-(4'-carboxyphenylazo)-4-isopropoxy-1-naphthol having the structure:

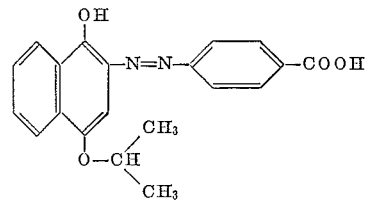

prepared as in Example II above, until a uniformly pigmented composition is obtained. The resulting composition is applied to a clean metal surface, giving a smooth finish when air dried and after heating from 5 to 30 minutes at temperatures ranging from 80° C. to 200° C., gives finishes having high gloss, a brilliant red color and good flexibility and adhesion characteristics.

Example XXIII

A pigmented polystyrene material suitable for use as a coating or molding composition is prepared as follows: A mixture of about 100 parts polystyrene and about 25

TABLE I

| 1 | 2 | 3 | 4 | 5 | 6 |
|---|---|---|---|---|---|
| III | 3.5 | 2-toluidine | 6.0 | 4-ethoxy-1-naphthol | 2-(2'-toluazo)-4-ethoxy-1-napthol. |
| IV | 4.0 | 3-amino-benzoic acid | 6.5 | 4-n-propoxy-1-naphthol | 2-(3'-carboxyphenylazo)-4-n-propoxy-1-naphthol. |
| V | 3.5 | 4-ethyl aniline | 6.5 | 4-isopropoxy-1-naphthol | 2-(4'-ethylphenylazo)-4-isopropoxy-1-naphthol. |
| VI | 3.5 | 3-cyano aniline | 5.5 | 4-methoxy-1-naphthol | 2-(3'-cyanophenylazo)-4-methoxy-1-naphthol. |
| VII | 4.0 | 4-chloroaniline | 6.5 | 4-isopropoxy-1-naphthol | 2-(4'-chlorophenylazo)-4-isopropoxy-1-naphthol. |
| VIII | 4.5 | 4-carbethoxy aniline | 6.5 | do | 2-(4'-carbethoxyphenylazo)-4-isopropoxy-1-naphthol. |
| IX | 3.5 | 3,5-dimethyl aniline | 6.0 | 4-ethoxy-1-naphthol | 2-(3',5'-dimethylphenylazo)-4-ethoxy-1-naphthol. |
| X | 5.5 | 2,4,6-trimethylaniline | 5.5 | 4-methoxy-1-naphthol | 2-(2',4',6'-trimethylphenylazo)-4-methoxy-1-naphthol. |
| XI | 4.5 | 2,4-dimethoxyaniline | 6.5 | 4-n-propxy-1-naphthol | 2-(2',4'-dimethoxyphenylazo)-4-n-propoxy-1-naphthol. |
| XII | 4.0 | 3-ethoxyaniline | 6.5 | 4-isopropoxy-1-naphthol | 2-(3'-ethoxyphenylazo)-4-isopropoxy-1-naphthol. |
| XIII | 7.5 | 3,5-dibromoaniline | 6.0 | 4-ethoxy-1-naphthol | 2-(3',5'-dibromophenylazo)-4-ethoxy-1-naphthol. |
| XIV | 7.0 | 4-sulfonamidoaniline | 6.5 | 4-n-propoxy-1-naphthol | 2-(4'-sulfonamidophenylazo)-4-n-propoxy-1-naphthol. |
| XV | 4.0 | 3-methyl-4-cyano benzoic acid | 5.5 | 4-methoxy-1-naphthol | 2-(3'-methyl-4'-cyano-phenylazo)-4-methoxy-1-naphthol. |
| XVI | 4.0 | 2-methyl-6-ethyl aniline | 6.0 | 4-ethoxy-1-naphthol | 2-(2'-methyl-6'-ethyl-phenylazo)-4-ethoxy-1-naphthol. |
| XVII | 4.5 | 3-methoxy-4-methyl aniline | 6.5 | 4-isopropoxy-1-naphthol | 2-(3'-methoxy-4'-methyl-phenylazo)-4-isopropoxy-1-naphthol. |
| XVIII | 4.5 | 4-isopropoxyaniline | 6.5 | do | 2-(4'-isopropoxyphenylazo)-4-isopropoxy-1-naphthol. |
| XIX | 4.5 | 3-butylaniline | 6.0 | 4-ethoxy-1-naphthol | 2-(3'-butylphenylazo)-4-ethoxy-1-naphthol. |
| XX | 4.0 | 3,5-dimethoxyaniline | 7.0 | 4-butoxy-1-naphthol | 2-(3',5'-dimethoxyphenylazo)-4-butoxy-1-naphthol. |

The compositions of this invention are especially useful as pigments for coloring paints, varnishes, and other coating and molding compositions. For such uses, the pigment must generally be in finely powdered form. The particles may be reduced to a fine powder, for instance, by dispersing the material in a hydrocarbon liquid and ball milling for about 48 hours.

parts 2-(3'-cyanophenylazo)-4-methoxy-1-naphthal having the structure:

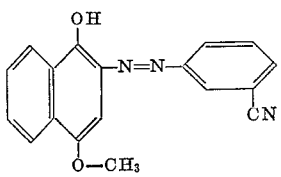

synthesized as in Example VI above is prepared by milling the ingredients on hot rolls for about 20 minutes at a temperature of about 170° to 200° C. This concentrate is removed from the rolls as a sheet, cooled and ground to a powder. About 2 parts of the ground concentrate and about 10 parts of polystyrene are dissolved in about 90 parts of a monomeric styrene and the mixture is poured into a cylindrical container. The container is placed in a heating chamber with its long axis in a vertical direction and the styrene is polymerized by heating at a temperature of about 90° C. for about 7 hours, then raising the temperature to about 200° C. and heating for about an additional 48 hours to complete the polymerization. After polymerization the product is removed from the container as a single block of pigmented polystyrene and cut into sections. Inspection shows a uniform distribution of the insoluble pigment throughout the entire mass of polystyrene. The resulting bright magenta colored sheets of polystyrene may be useful as sheets, may be further reshaped into commercial products, or may be ground to a powder and molded by conventional molding techniques.

In addition to the specific uses listed in the above examples, it has been found that the compositions of this invention may be dispersed in other natural and synthetic resins resulting in magenta compositions suitable for coating and molding processes. Any suitable carrier resin may be used. Typical resins include balsam resins, phenol resins, phenol resins modified with colophonyl and other resins, of which colophony constitutes a major part, coumarone resins and indine resins and the substances covered by the collective term "synthetic lacquer resins" which include processed natural substances, such as cellulose ether; polymers such as polyvinylchlorides, polyvinylacetate, polyvinylacetals, polyvinylethers, polyacrylic and polymethacrylic esters, polystyrene and isobutylene; polycondensates, e.g. polyesters such as phthalate resins, alkyd resins, maleic acid resins, phenolformaldehyde resins, ureaformaldehyde resins, melamine formaldehyde condensates, aldehyde resins, ketone resins, xylene formaldehyde resins, polyactams and polyamides; epoxy resins; polyadducts, such as polyurethanes; and suitable mixtures or copolymers thereof.

The compositions of this invention are further useful as pigments in paper making processes when a magenta colored paper is desired. The pigments of this invention may also be dispersed in synthetic filament forming materials useful in the production of synthetic textiles. The compositions have further uses in certain insecticides, herbicides and fungicides. The photoconductive characteristics of these compounds, i.e. their ability to hold an electrostatic charge in the dark and dissipate it in the light, makes them also useful in various electrophotographic imaging processes. The compositions and/or magenta pigments of this invention may have other materials mixed therewith to enhance, synergize, or otherwise modify their properties.

Although specific materials and conditions were set forth in the above exemplary processes of making and using the compounds of this invention, these were merely meant as illustrations of the present invention. Various other carriers, substituents and uses such as those listed above, and various conditions may be substituted for those in the examples with similar results. Many other modifications of the present invention will occur to those skilled in the art upon reading the present disclosure; these are intended to be encompassed within the spirit of this invention.

What is claimed is:
1. A composition having the formula:

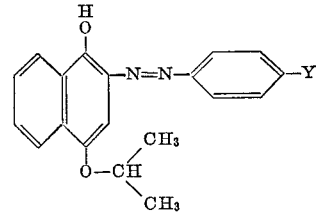

wherein Y is selected from the group consisting of carboxy, lower alkoxy, lower carbalkoxy, and lower alkyl radicals.

2. 2-(4'-toluazo)-4-isopropoxy-1-naphthol.
3. 2-(4'-carboxyphenylazo)-4-isopropoxy-1-naphthol.

References Cited
UNITED STATES PATENTS

| | | | |
|---|---|---|---|
| 2,778,816 | 1/1957 | Baehler et al. | 260—197 X |
| 2,936,304 | 5/1960 | Neier et al. | 260—197 X |
| 3,163,634 | 12/1964 | Conrad | 260—197 X |

OTHER REFERENCES

Kuroki et al., C. A. vol. 51, p. 4714g (1957).
Inove et al., C. A., vol. 55, pp. 13853–13854 (1961).

FLOYD D. HIGEL, *Primary Examiner.*